US010442546B2

(12) United States Patent
Rheaume et al.

(10) Patent No.: US 10,442,546 B2
(45) Date of Patent: Oct. 15, 2019

(54) CAVITATION MITIGATION IN CATALYTIC OXIDATION FUEL TANK INERTING SYSTEMS

(71) Applicant: Hamilton Sundstrand Corporation, Charlotte, NC (US)

(72) Inventors: Jonathan Rheaume, West Hartford, CT (US); Haralambos Cordatos, Colchester, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 15/922,553

(22) Filed: Mar. 15, 2018

(65) Prior Publication Data

US 2019/0283896 A1    Sep. 19, 2019

(51) Int. Cl.
| | | |
|---|---|---|
| *B64D 37/32* | (2006.01) | |
| *B64D 37/16* | (2006.01) | |
| *B64D 37/34* | (2006.01) | |
| *F02C 7/141* | (2006.01) | |
| *B01J 19/14* | (2006.01) | |
| *B01D 63/08* | (2006.01) | |

(52) U.S. Cl.
CPC ........... *B64D 37/32* (2013.01); *B01D 63/082* (2013.01); *B01J 19/14* (2013.01); *B64D 37/16* (2013.01); *B64D 37/34* (2013.01); *F02C 7/141* (2013.01); *B01D 2313/086* (2013.01)

(58) Field of Classification Search
CPC ........ B64D 37/32; B64D 37/16; B64D 37/34; B01D 63/084; F02C 7/141
USPC ........................................................ 422/187
See application file for complete search history.

(56) References Cited

U.S. PATENT DOCUMENTS

| | | | |
|---|---|---|---|
| 3,580,848 A * | 5/1971 | Furby | ...................... C10M 3/00 |
| | | | 252/387 |
| 3,847,298 A | 11/1974 | Hamilton | |
| 3,891,411 A * | 6/1975 | Meyer | .................. C01B 21/045 |
| | | | 95/102 |
| 6,709,492 B1 * | 3/2004 | Spadaccini | ........ B01D 19/0031 |
| | | | 95/46 |
| 7,465,336 B2 | 12/2008 | McHugh | |
| 8,499,567 B2 * | 8/2013 | Hagh | ..................... B01D 53/75 |
| | | | 244/135 R |
| 8,828,344 B2 | 9/2014 | K-Wlam et al. | |
| 2005/0279208 A1 | 12/2005 | Schwalm | |
| 2008/0128048 A1 | 6/2008 | Johnson et al. | |
| 2012/0279395 A1 * | 11/2012 | K-Wlam | ................ B64D 37/32 |
| | | | 95/183 |

(Continued)

FOREIGN PATENT DOCUMENTS

| | | |
|---|---|---|
| EP | 2520493 A2 | 7/2012 |
| GB | 2369071 A | 5/2005 |

OTHER PUBLICATIONS

Extended European Search Report for EP Application No. 19162273.7, dated Jul. 5, 2019, pp. 11.

*Primary Examiner* — Huy Tram Nguyen
(74) *Attorney, Agent, or Firm* — Kinney & Lange, P.A.

(57) ABSTRACT

A fuel tank inerting system uses a catalytic oxidation unit to combust fuel from the fuel tank to produce inert gas, simultaneously working with a gas separator that removes dissolved carbon dioxide from the fuel before it is cycled to the thermal management system (TMS) or the engine. This prevents cavitation of carbon dioxide (gaseous bubbling) within the fuel at varying temperatures while in flight.

20 Claims, 4 Drawing Sheets

(56) References Cited

U.S. PATENT DOCUMENTS

2015/0147252 A1* 5/2015 Sawamura ........... B01D 61/362
                                                           423/228
2016/0305440 A1* 10/2016 Laboda ............... F04D 29/2288

* cited by examiner

CAVITATION MITIGATION IN CATALYTIC OXIDATION FUEL TANK INERTING SYSTEMS

BACKGROUND

This application relates generally to fuel tank inerting systems, and specifically to catalytically inerted fuel tank systems.

Fuel tanks can contain potentially combustible combinations of oxygen, fuel vapors, and ignition sources. In order to prevent combustion in aircraft fuel tanks, commercial aviation regulations require actively managing the risk of explosion in ullage of fuel tanks; this is typically accomplished by decreasing the oxygen partial pressure in the ullage in fuel tanks to less than 12%, or less than 9% for military vehicles. Conventional fuel tank inerting systems use air separation modules that separate out oxygen and humidity from incoming bleed air, generating nitrogen enriched air (inert air) to fill the ullage of the fuel tank.

An alternative method is to use catalytic oxidation to produce an inert air stream that does not require use of pressurized bleed air. Catalytic oxidation includes burning of fuel with a catalyst with air to produce inert gas. With proper thermal and humidity management, the resulting inert gas can be introduced into the ullage of the fuel tank as a fuel tank inerting method.

Catalytic oxidation produces inert gas (mostly nitrogen), but also produces byproducts water vapor and carbon dioxide. When heavy fuel fractions are used in catalytic oxidation, about 15% of the produced inert gas is carbon dioxide. The remainder of inert gas produced in catalytic oxidation is mostly nitrogen and water vapor, which can be removed prior to introduction to the fuel tanks. However, when the inert gas is introduced to the ullage of the fuel tank, the solubility of carbon dioxide in kerosene-based fuel is much greater than oxygen or nitrogen, and the solubility of carbon dioxide decreases as the fuel temperature rises due to the fuel's use as a heat sink in aircraft engines. This creates a unique problem with dissolved carbon dioxide.

In aircraft, fuel travels from the fuel tanks to the engines. A commercial aircraft typically contains at least three fuel tanks: one or more are located in each wing in addition to one in the fuselage. Along the fuel flow path from the fuel tanks to the engine, fuel is used for temperature regulation throughout the aircraft engines. If high levels of carbon dioxide are dissolved in fuel, cavitation (bubbling) due to carbon dioxide dissolved in the fuel can occur at undesirable locations within the aircraft engine fuel system.

SUMMARY

In one embodiment, an inert gas generation system for a fuel tank includes a catalytic oxidation unit configured to receive and combust a first portion of fuel from the fuel tank to produce an inert gas, an inert gas line configured to receive the inert gas from the catalytic oxidation unit and direct the inert gas to the fuel tank, wherein a portion of the inert gas dissolves in fuel inside the fuel tank, and a gas separator unit configured to receive a second portion of fuel from the fuel tank, wherein the second portion of fuel contains dissolved gas, and wherein the gas separator unit is configured to remove the dissolved gas from the second portion of the fuel.

In another embodiment, a method of inerting fuel includes separating fuel into a first portion of fuel and a second portion of fuel, directing the first portion of fuel to a catalytic oxidation unit, combusting the first portion of fuel in the catalytic oxidation unit to produce inert gas, routing the inert gas to a location requiring inert gas, directing the second portion of fuel to a gas separator, wherein the second portion of fuel contains dissolved gases, degassing the second portion of fuel in the gas separator to produce degassed fuel, and directing the degassed fuel to an outlet.

DETAILED DESCRIPTION

Figure 1A:
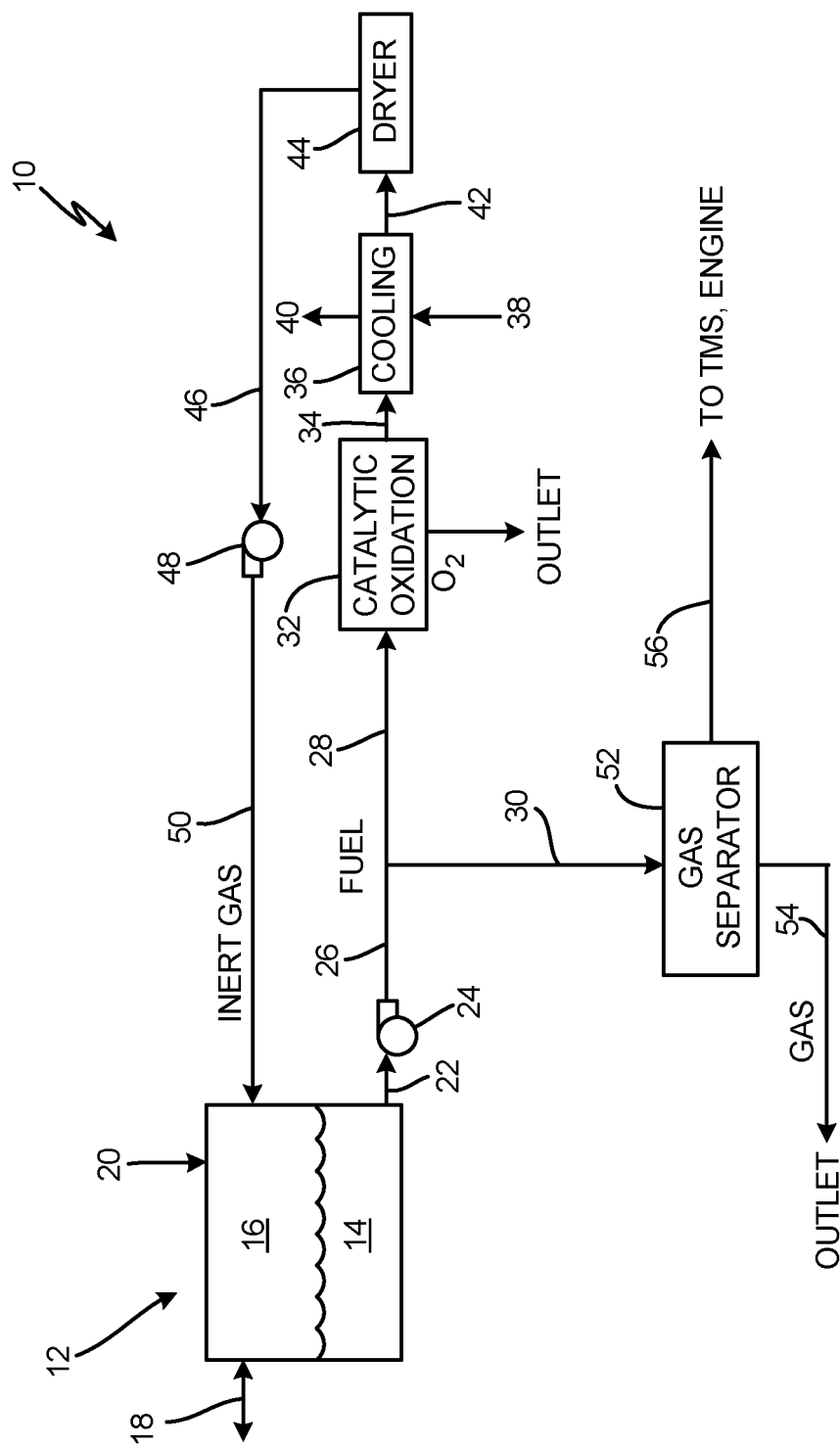
FIGS. 1A-1B are schematic diagrams of a catalytic oxidation fuel tank inerting system with a gas separator component in varying embodiments.

Catalytic oxidation can be used to inert fuel tanks in aircraft. This is accomplished through burning fuel and air to generate inert gas containing nitrogen and carbon dioxide. However, catalytic oxidation increases carbon dioxide in the ullage of the fuel tank by more than 500 times. Fuel in the fuel tank has an affinity to absorb carbon dioxide to a larger extent than other permeate gases. For instance, carbon dioxide is five times more soluble in fuel than oxygen, in such a system, and ten times more soluble than nitrogen. Elevating the amount of carbon dioxide in the ullage of the fuel tank can result in a large quantity of carbon dioxide dissolved in the fuel. This is in part due to the movement of fuel within the fuel tank during aircraft flight.

A unique problem occurs with carbon dioxide dissolved in fuel. When the fuel moves throughout the aircraft engine fuel system, heat injection in to the fuel promotes evolution of carbon dioxide from the fuel. During particular flight phases (e.g., idle or idle descent), carbon dioxide cavitation can occur in the fuel system at various locations through which fuel flows, such as pump inlets, leading to cavitation. Cavitation can cause fuel flow pulsations, erosion of aircraft fuel system parts or the fuel path, hydraulic hammer, or air lock issues within the aircraft engine fuel system due to evolving carbon dioxide. In particular, gear pump inlets and boost pump suction feeds are cavitation danger locations on account of low pressures.

Any gas in contact with fuel will dissolve in the fuel at a level proportional to the partial pressure of the gas in contact with the fuel. According to Henry's Law, at a constant temperature, the amount of a given gas that dissolves in a given type and volume of liquid is directly proportional to the partial pressure of that gas in equilibrium with that liquid. The coefficient of proportionality is referred to as the Ostwald coefficient, which represents the milliliters of gas dissolved per milliliter of liquid and per atmosphere partial pressure of the gas at a given temperature. The Ostwald coefficient is unique to each gas.

Overall, under ambient conditions, the Ostwald coefficient for oxygen leads to a dissolved oxygen concentration in fuel at the order of 70 ppm (70 mg $O_2$ per kg of fuel). This corresponds to about 4% by volume oxygen dissolved in fuel. Thus, if allowed to expand as a gas, the amount of oxygen dissolved in a given volume of fuel would occupy about 4% of that volume.

If that amount of oxygen were to evolve inside a fuel system, it may cause vapor lock, or an interruption in the flow of a liquid through a fuel line as a result of vaporization of the liquid. Vapor lock is a well-known issue in use of aviation gasoline wherein volatile fuel vaporizes in the fuel system due to a rise in temperature and occludes the flow of fuel.

Sudden expansion of dissolved oxygen as jet fuel temperature increase has not been an issue, because oxygen solubility in jet fuel increases with temperature. This is also true of dissolved nitrogen. Specifically, the Ostwald coefficient of both oxygen and nitrogen increase with temperature. Thus, when fuel delivered at ambient temperatures in the fuel tanks is then pumped out and heated downstream, the fuel has no tendency to spontaneously release any gaseous components.

However, the Ostwald coefficient for carbon dioxide is about five times larger than that of oxygen. Thus, fuel exposed to about 15% carbon dioxide will absorb roughly 260 ppm carbon dioxide. If the carbon dioxide is allowed to expand, it would be about 14% by volume of the fuel.

Unlike oxygen and nitrogen, the Ostwald coefficient for carbon dioxide decreases with temperature; this means that as fuel temperature increases, carbon dioxide is less soluble in fuel. Carbon dioxide exhibits opposite behavior compared to oxygen and nitrogen. Thus, when cold fuel containing dissolved carbon dioxide exits the fuel tank and is heated on its way through the fuel system (particularly where fuel is used as a heat sink in other parts of the aircraft), carbon dioxide has a tendency to spontaneously evolve, especially in areas of low pressure such as pump inlets. At ambient temperatures, carbon dioxide can evolve a volume of up to 14% by volume in the fuel flow, which may cause cavitation in the fuel flow. At sub-ambient temperatures, fuel holds more carbon dioxide, so the amount of carbon dioxide evolution from fuel would be higher. If fuel were saturated with carbon dioxide, current aircraft fuel systems may not be able to handle such an evolution of carbon dioxide. Cavitation of carbon dioxide and vapor lock will become increasingly problematic as more aircraft use catalytic oxidation for fuel tank inerting. Technology for removing carbon dioxide from fuel resulting from catalytic oxidation fuel tank inerting is necessary to prevent vapor lock in fuel system.

In one embodiment of a catalytic fuel tank inerting system, the fuel is separated prior to being processed in the catalytic oxidation unit. Thus, a first portion of fuel is vaporized or atomized in order to generate inert gas through catalytic oxidation. Meanwhile, a second portion of fuel is directed on a path to the engine. A gas separator device is placed downstream of the fuel tank but upstream of the engine to remove dissolved carbon dioxide (or other gases) prior to locations where liquid fuel is used as a heat sink. Use of a gas separator device prevents later cavitation of carbon dioxide and associated vapor lock.

Figure 1B:
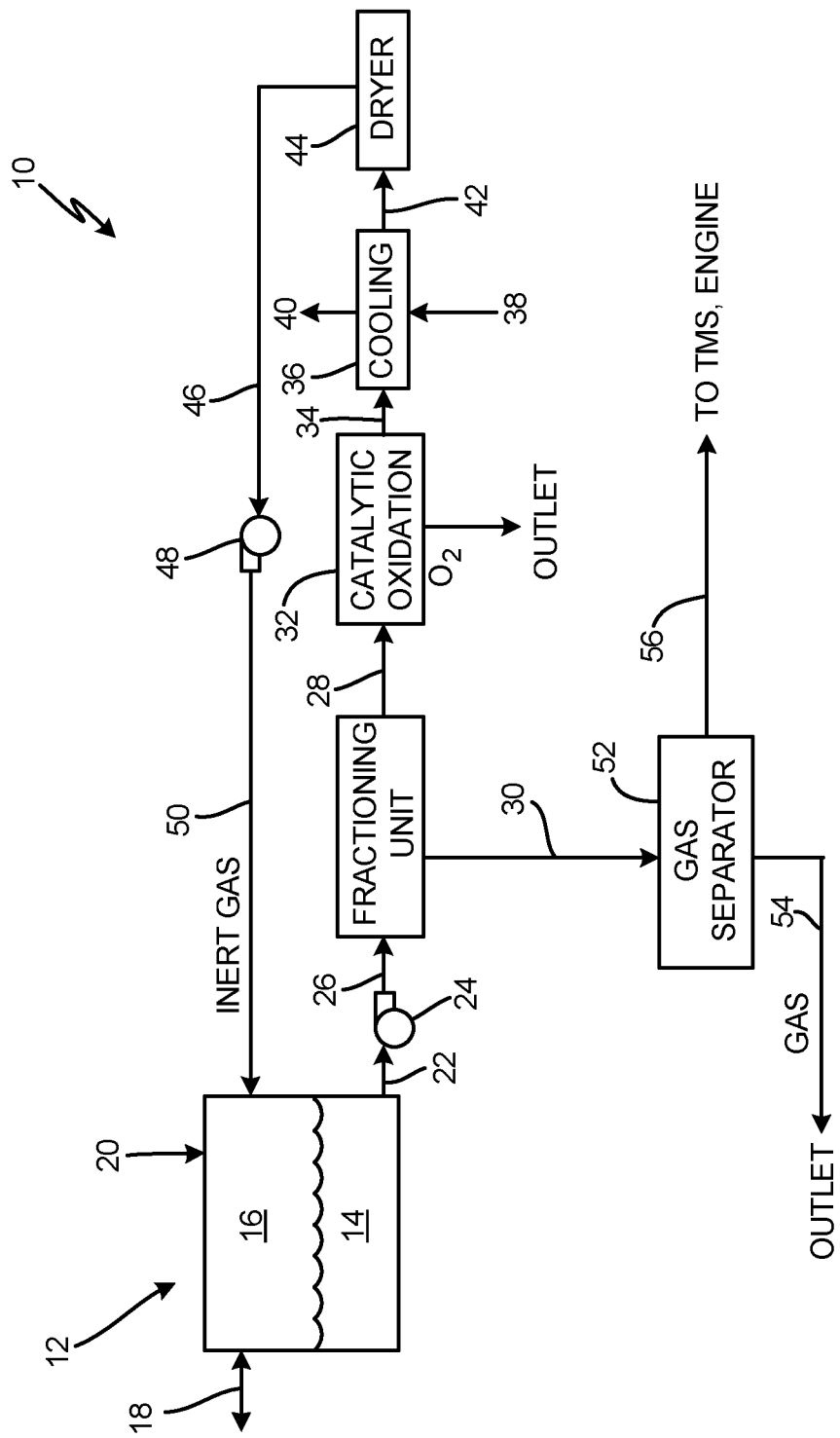

FIGS. 1A-1B are schematic block diagrams of a catalytic oxidation fuel tank inerting system with a gas separator component in varying embodiments. Fuel tank inerting (FTI) system 10 of FIG. 1A includes fuel tank 12 (with fuel 14, ullage 16, vent 18, and fuel fill 20), fuel line 22, pump 24, pump outlet line 26, first portion fuel line 28, second portion fuel line 30, catalytic oxidation unit 32, inert gas line 34, cooling unit 36, cooling airflow lines 38, 40, cooled inert gas line 42, dryer 44, dried inert air line 46, fan 48, return line 50, gas separator 52, dissolved gases line 54, and fuel outlet 56.

Fuel tank 12 is an aircraft fuel tank holding jet fuel 14 and having ullage 16, a gaseous portion of fuel tank 12 adjacent fuel 14. Ullage 16 of fuel tank 12 can be filled with an inert gas by regulation in order to prevent spontaneous combustion of jet fuel 14. Fuel tank 12 may be in communication with outside air via vent 18. Vent 18 may provide a source of oxygen throughout the entire flight envelope to fuel tank 12. Fuel tank 12 is filled with jet fuel 14 through fuel fill 20. Fuel tank 12 is in communication with the other components of FTI system 10 through fuel line 22, which directs fuel from fuel tank 12 to pump 24. Pump 24 draws fuel out of fuel tank 12 and to pump outlet line 26.

Pump outlet line 26 directs fuel to catalytic oxidation unit 32 or to gas separator 52. In this embodiment, liquid fuel from fuel tank 12 can be separated within pump outlet line 26 by a valve system with a mass flow controller to divert part of the fuel flow to an atomizer and subsequently into catalytic oxidation unit 32 and gas separator 52. Alternatively, fuel vapors from ullage 16 can be split in pump outlet line 26 into two streams by a pressure system (e.g., pumps, valves), or sparging fuel (bubbling of fuel) can be used. In a different embodiment, fuel can be separated into two portions within the fuel tank and drawn out with pumps. In still another embodiment, discussed with reference to FIG. 1B, a fuel fractioning unit can be located on pump outlet line 26.

Once fuel is split into two streams, a first portion of fuel is directed towards catalytic oxidation unit 32 through first portion fuel line 28 to produce an inert gas to inert fuel tank 12. A second portion of fuel is directed towards gas separator 52 through second portion fuel line 30, where dissolved carbon dioxide and other gases are removed prior to the second portion of fuel running through the aircraft for temperature regulation and to the engine.

Catalytic oxidation unit 32 accepts fuel vapor from first portion fuel line 28. Fuel vapor is made up of nitrogen, fuel vapor, and oxygen. Catalytic oxidation unit 32 uses oxygen as an oxidizing agent to oxidize fuel vapor from first portion fuel line 28. The resulting products are primarily carbon dioxide and water. The resulting products along with nitrogen, which is passed through catalytic oxidation unit 32, are provided to inert gas line 34.

Catalytic oxidation unit 32 typically includes a catalyst. For example, the catalyst used in the reaction may comprise noble metals, precious metals, transition metals, metal oxides, rare earth oxides, nitrides, carbides, enzymes, combinations thereof, or any other suitable catalytic material. The catalytic oxidation unit 32 can also include a combustion air source. In order to provide sufficient quantities of inert air for fuel tank inerting and cargo hold fire suppression, the catalytic oxidation reaction should be controlled. Not only may additional fuel need to be supplied as described above, but additional oxygen from a combustion air source may also need to be provided to drive the reaction in catalytic oxidation unit 32. When inert gas exits catalytic oxidation unit 32, it is directed through inert gas line 34 to cooling unit 36.

Cooling unit 36 temperature regulates inert gas exiting catalytic oxidation unit 32. Catalytic oxidation unit 32 is heated while operating, meaning inert air exiting catalytic oxidation unit 32 is hot (typically between 100 degrees Celsius and 1,000 degrees Celsius, with temperatures between 250 degrees Celsius and 450 degrees Celsius being most common). Cooling unit 36 includes cooling fluid airstream inlet 38 and cooling fluid airstream outlet 40. A cooling fluid airstream runs from inlet 38 across cooling unit 36 to outlet 40 to cool down inert air from catalytic oxidation unit 32. Cooling unit 36 can be a heat sink, a heat exchanger, or other temperature control device.

After the inert air is cooled, it is directed through cooled inert air line 42 to dryer 44. Catalytic oxidation unit 32 produces inert air containing nitrogen and water vapor. Dryer 44 reduces the amount of water vapor in the inert air.

Dryer 44 can be a chemical dryer or mechanical dryer. After the inert air is dried, it is directed through inert air line 46 to fan 48. Fan 48 further dries the inert air and directs the inert air into return line 50, which in turn directs the inert air back to ullage 16 of fuel tank 12.

While a first portion of fuel vapor is directed to catalytic oxidation unit 32, a second portion of fuel is directed to gas separator 52. Gas separator 52 serves to remove dissolved carbon dioxide from the fuel stream. Gas separator 52 can be a membrane-based fuel stabilization unit (FSU), such as those described in U.S. Pat. No. 6,709,492 or 7,465,336. These types of FSU rely on polymer membranes to separate gaseous contaminants, such as carbon dioxide, from fuel flow. In membrane-based gas separators, the fuel comes in contact with the fluoropolymer membrane and dissolved gases permeate the membrane driven by a partial pressure differential.

The partial pressure differential is accomplished by exposing the opposite side of the membrane to a vacuum or sweep gas. For instance, a perfluoro-polymer-based membrane is permeable to both carbon dioxide (mitigating cavitation and vapor lock) and oxygen (discouraging carbonaceous deposit formation), allowing such gases to pass through the membrane and out of the fuel flow. Suitable membranes include amorphous fluoropolymer membranes such as perfluoroalkoxy membranes. These types of gas separators are discussed in more detail with reference to FIGS. 2A and 2B. Alternatively, a degassing pump-based gas separator may be used. This type of gas separator is discussed with reference to FIG. 2C.

Gas separator 52 directs separated carbon dioxide, oxygen, nitrogen, water vapor, or other gaseous containments separated out of fuel down dissolved gases line 54, where they can be dumped overboard or directed elsewhere in the aircraft. Fuel that has gone through gas separator 52 is directed down fuel outlet 56 towards the engine and thermal management systems (TMS).

FIG. 1B shows FTI system 60, which is similar to system 10 in FIG. 1A, and contains many of the same components. The same components in FIG. 1A and FIG. 1B perform the same functions unless otherwise noted. However, FTI system 60 includes fuel fractioning unit 58. Fuel fractioning unit 58 may accept a fuel stream from fuel tank 12 via line 22, pump 24 and line 26. The amount of fuel provided to fuel fractioning unit 58 may be varied such that a desired amount of inert gas is generated during the entire flight envelope. Fuel fractioning unit 58 takes in fuel from fuel tank 12 and separates light fuel fractions from heavy fuel fractions, where the light fuel fractions are generally more volatile and contain less sulfur. The light fuel fractions are directed towards catalytic oxidation unit 32 via line 28, and the heavy fuel fractions to gas separator 52 via line 30.

Fuel separation by fuel fractioning unit 58 may be achieved, for example, by membrane separation through the use of a sweep gas or a vacuum source. The vacuum source may be, for example, an ejector, a diaphragm vacuum pump, a scroll pump, or other suitable pump. Fuel separation may also be achieved through condensation of fuel vapor. Because the demand for inerting gas may be greater than the amount of fuel vapor present in ullage 16 when an aircraft is flying at cruise altitude, several ways to further regulate the amount of fuel vapor produced from ullage 16 are contemplated. For example, additional fuel vapor may be provided through the addition of a heat source, such as a heating element or a recuperating heat exchanger. The temperature and flow rate of a sweep gas may also be varied to control fuel vapor production from ullage 16.

Figure 2A:
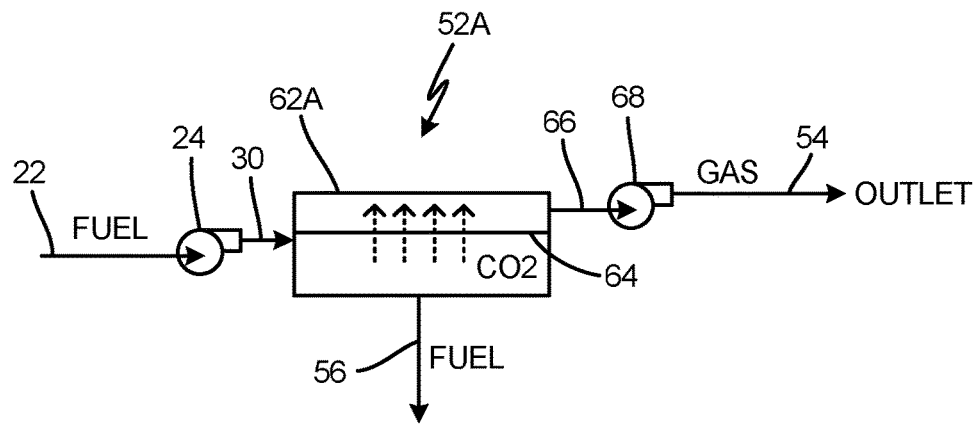
FIGS. 2A-2C are schematic diagrams of a gas separator component in varying embodiments.
Figure 2B:
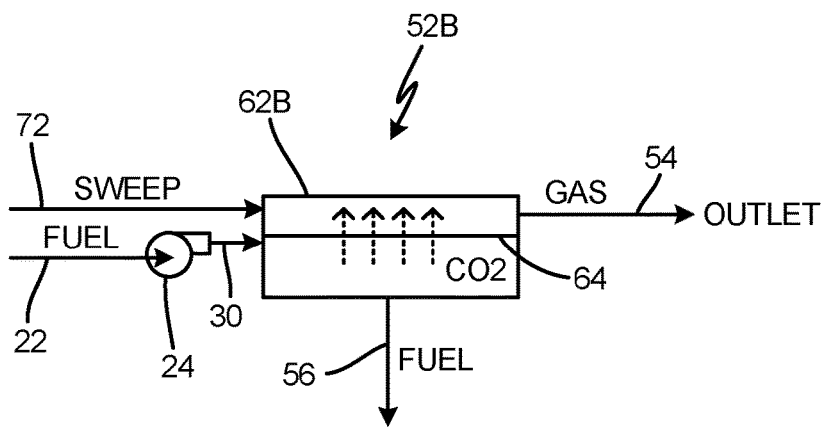
Figure 2C:
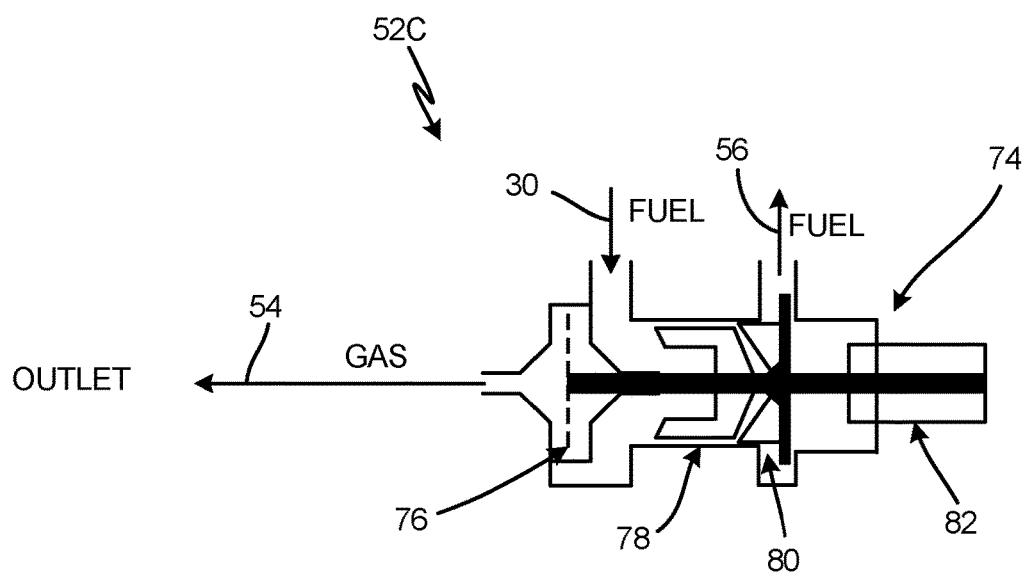

FIGS. 2A-2C are schematic diagrams of three different embodiments 52A, 52B, and 52C, of a gas separator component. In addition to these embodiments, alternative types of gas separators can be used, including use of a vacuum chamber with a membrane-less vacuum source. FIG. 2A shows gas separator 52A containing vacuum assisted carbon dioxide ($CO_2$) separation unit 62A, with fuel line 22, pump 24, second portion fuel line 26, dissolved gases line 54, and fuel outlet 56 (components also shown in FIGS. 1A-1B), in addition to membrane 64, vacuum line 66, and vacuum source 68.

In FIG. 2A, fuel containing dissolved gas (such as carbon dioxide) is pumped from fuel line 22 by pump 24 to vacuum assisted $CO_2$ separation unit 62A. In unit 62A, dissolved gases are separated out of the fuel. Removed gases, such as carbon dioxide, water vapor, nitrogen, and oxygen, are sent through dissolved gases line 54. De-gassed fuel is sent out fuel outlet 56 towards the TMS and the engine.

Vacuum assisted $CO_2$ separation unit 62A is a membrane based gas separator system. In membrane-based fuel degassing systems, the fuel comes in contact with membrane 64 (such as a fluoropolymer membrane), and dissolved gases permeate the membrane driven by a partial pressure difference. In separation unit 62A, the partial pressure difference is accomplished with vacuum source 68, in fluid communication with separation unit 62A through vacuum line 66. Vacuum source 68 provides a partial pressure differential across membrane 64, driving dissolved gases out of the fuel and across the membrane.

Vacuum source 68 can be, for example, a vacuum pump. Preferentially the vacuum pump is an operating fluid-free vacuum pump such as a diaphragm vacuum pump, a rocking piston vacuum pump, a scroll vacuum pump, a roots vacuum pump, a parallel screw vacuum pump, a claw type vacuum pump, or a rotary vane vacuum pump. The vacuum source 68 should be oil-free to prevent oil build-up in the system. Furthermore, vacuum source 68 can be an ejector of fixed or variable throat area, or an array of ejectors.

When the dissolved gases (carbon dioxide, oxygen, nitrogen, water vapor, etc.) are removed from the fuel flow, they can be vented overboard, mixed with fuel vapors into the catalytic oxidation unit, returned to the fuel tank, or used for other purposes aboard the aircraft.

FIG. 2B shows gas separator 52B containing sweep gas assisted carbon $CO_2$ separation unit 62B with fuel line 22, pump 24, second portion fuel line 30, dissolved gases line 54, and fuel outlet 56 (components also shown in FIGS. 1A-1B), in addition to membrane 64 (also shown in FIG. 2A) and sweep gas line 72.

In FIG. 2B, fuel containing dissolved gas (such as carbon dioxide) is pumped from fuel line 22 by pump 24 to sweep gas assisted $CO_2$ separation unit 62B. In unit 62B, dissolved gases are separated out of the fuel. Removed gases, such as carbon dioxide, water vapor, nitrogen, and oxygen, are sent through dissolved gases line 54. De-gassed fuel is sent out fuel outlet 56 towards the thermal management system (TMS) and the engine.

Sweep gas assisted carbon $CO_2$ separation unit 62B is similar to unit 62A in that it is a membrane-based gas separation unit. In membrane-based fuel degassing systems, the fuel comes in contact with membrane 64 (such as a fluoropolymer membrane), and dissolved gases permeate the membrane driven by a partial pressure difference. In separation unit 62B, the partial pressure difference is accomplished by a sweep gas inserted to unit 62B via sweep gas line 72. The sweep gas provides a partial pressure differential across membrane 64, driving dissolved gases out of the fuel and across the membrane.

Sweep gas can be bleed air, ram air, cabin air, or other air from the aircraft. Thermal management of the sweep gas is important; if bleed air is used for the sweep gas, it must be cooled to avoid damaging membrane 64. If ram air is used for the sweep gas, it must be heated to avoid gelling fuel. Sweep gas will effectively remove dissolved carbon dioxide from the fuel, but not necessarily dissolved oxygen or nitrogen (compared to a vacuum source driven gas separator).

In both FIGS. 2A and 2B, the fuel is separated from the vacuum source or sweep gas by a membrane. This has the additional advantage of preventing fuel vapor from evolving and transporting across the oleophobic membrane with the dissolved gases. However, it is possible to draw out fuel vapors in other embodiments, such as the degassing pump described with reference to FIG. 2C.

FIG. 2C shows gas separator system 52C containing de-gassing pump based gas separator 74 with fuel line 30, dissolved gases line 54, and fuel outlet 56 (components also shown in FIGS. 1A-1B), in addition to separating impeller 76, inducer 78, rotor impeller 80, and motor 82.

In de-gassing pump based gas separator 74, fuel enters unit 74 through second portion fuel line 30 from fuel tank 12 (and optionally fuel fractioning unit 58). Unit 74 removes dissolved gases from the fuel, expelling dissolved gases through dissolved gas line 54 and de-gassed fuel through fuel outlet 56.

When fuel enters degassing pump 74, separating impeller 76 prevents fuel from leaving out dissolved gas line 54. Inducer 78 can be a thin film of fuel to induce fuel to liquefy. Rotor impeller 80 can be a rotor pinwheel, applying pressure to the fuel. Inducer 78 and rotor impeller 80 move fuel along the body of unit 74 toward degassed fuel outlet 56, separating out dissolved gases from liquid fuel. Motor 82 activates, separating impeller 76, inducer 78, and rotor impeller 80.

Fuel tank inerting with catalytic combustion has several benefits, but its unintended consequences of dissolved gases in fuel must be addressed. In particular, at ambient temperature, carbon dioxide has approximately ten times more solubility in fuel compared to nitrogen, and decreasing solubility with temperature. The solubility of carbon dioxide in kerosene-based fuels is even higher when fuel temperatures are below ambient, which can occur on an aircraft during "top of" (initial) descent. This may cause downstream cavitation and vapor lock problems.

The proposed catalytic fuel tank inerting system coupled with a gas separator allows for removal of carbon dioxide dissolved in fuel prior to fuel being used for thermal regulation throughout the aircraft, preventing cavitation and vapor lock. Membrane-based methods of gas removal can be used, or degassing pumps, or other methods to remove gases such as carbon dioxide.

Discussion of Possible Embodiments

The following are non-exclusive descriptions of possible embodiments of the present invention.

An inert gas generation system for a fuel tank includes a catalytic oxidation unit configured to receive and combust a first portion of fuel from the fuel tank to produce an inert gas, an inert gas line configured to receive the inert gas from the catalytic oxidation unit and direct the inert gas to the fuel tank, wherein a portion of the inert gas dissolves in fuel inside the fuel tank, and a gas separator unit configured to receive a second portion of fuel from the fuel tank, wherein the second portion of fuel contains dissolved gas, and wherein the gas separator unit is configured to remove the dissolved gas from the second portion of the fuel.

The system of the preceding paragraph can optionally include, additionally and/or alternatively, any one or more of the following features, configurations and/or additional components:

The inert gas generation system includes a cooling unit downstream of the catalytic oxidation unit, the cooling unit configured to cool the inert gas.

The inert gas generation system includes a dryer downstream of the cooling unit, the dryer configured to dry inert gas.

The gas separator unit is a vacuum pump or ejector.

The gas separator unit is a membrane based unit.

The gas separator unit uses a sweep gas.

The gas separator unit comprises a fluoropolymer-based membrane.

The gas separator unit is a degassing pump.

The gas separator unit is a fuel stabilization unit.

The inert gas generation system includes a fuel fractioning unit upstream of the catalytic oxidation unit and the gas separator, the fuel fractioning unit configured to receive fuel from the fuel tank and to separate the fuel into the first portion of fuel and the second portion of fuel.

The fuel fractioning unit is configured to direct the first portion of fuel to the catalytic oxidation unit and to direct the second portion of fuel to the gas separator unit.

A method of inerting fuel includes separating fuel into a first portion of fuel and a second portion of fuel, directing the first portion of fuel to a catalytic oxidation unit, combusting the first portion of fuel in the catalytic oxidation unit to produce inert gas, routing the inert gas to a location requiring the inert gas, directing the second portion of fuel to a gas separator, wherein the second portion of fuel contains dissolved gases, degassing the second portion of fuel in the gas separator to produce degassed fuel, and directing the degassed fuel to an outlet.

The method of the preceding paragraph can optionally include, additionally and/or alternatively, any one or more of the following features, configurations and/or additional components:

Separating the fuel comprises creating a pressure differential.

Separating the fuel comprises fractioning the fuel.

The dissolved gases are selected from the group consisting of carbon dioxide, nitrogen, oxygen, and water vapor.

Degassing the second portion of fuel comprises using a vacuum source.

Degassing the second portion of fuel comprises using a membrane.

Degassing the second portion of fuel comprises using a degassing pump.

Degassing the second portion of fuel comprises using a membrane with a sweep gas.

Degassing the second portion of fuel comprises simultaneous removal of oxygen and carbon dioxide.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodi-

The invention claimed is:

1. An inert gas generation system for a fuel tank comprises:
   a catalytic oxidation unit configured to receive and combust a first portion of fuel from the fuel tank to produce an inert gas;
   an inert gas line configured to receive the inert gas from the catalytic oxidation unit and direct the inert gas to the fuel tank, wherein a portion of the inert gas dissolves in fuel inside the fuel tank; and
   a gas separator unit configured to receive a second portion of fuel from the fuel tank, wherein the second portion of fuel contains dissolved carbon dioxide, and wherein the gas separator unit is configured to remove the dissolved carbon dioxide from the second portion of the fuel.

2. The inert gas generation system of claim 1, further comprising a cooling unit downstream of the catalytic oxidation unit, the cooling unit configured to cool the inert gas.

3. The inert gas generation system of claim 2, further comprising a dryer downstream of the cooling unit, the dryer configured to dry inert gas.

4. The inert gas generation system of claim 1, wherein the gas separator unit uses a vacuum pump or ejector.

5. The inert gas generation system of claim 4, wherein the gas separator unit is a membrane-based unit.

6. The inert gas generation system of claim 5, wherein the gas separator unit uses a sweep gas.

7. The inert gas generation system of claim 5, wherein the gas separator unit comprises a fluoropolymer-based membrane.

8. The inert gas generation system of claim 4, wherein the gas separator unit is a degassing pump.

9. The inert gas generation system of claim 1, wherein the gas separator unit is a fuel stabilization unit.

10. The inert gas generation system of claim 1, further comprising a fuel fractioning unit upstream of the catalytic oxidation unit and the gas separator, the fuel fractioning unit configured to receive fuel from the fuel tank and to separate the fuel into the first portion of fuel and the second portion of fuel.

11. The inert gas generation system of claim 10, wherein the fuel fractioning unit is configured to direct the first portion of fuel to the catalytic oxidation unit and to direct the second portion of fuel to the gas separator unit.

12. A method of inerting fuel comprises:
    separating fuel into a first portion of fuel and a second portion of fuel;
    directing the first portion of fuel to a catalytic oxidation unit;
    combusting the first portion of fuel in the catalytic oxidation unit to produce inert gas;
    routing the inert gas to a location requiring the inert gas;
    directing the second portion of fuel to a gas separator, wherein the second portion of fuel contains dissolved gases;
    degassing the second portion of fuel by removing carbon oxide in the gas separator to produce degassed fuel; and
    directing the degassed fuel to an outlet.

13. The method of claim 12, wherein separating the fuel comprises creating a pressure differential.

14. The method of claim 12, wherein separating the fuel comprises fractioning the fuel.

15. The method of claim 12, wherein the dissolved gases are selected from the group consisting of carbon dioxide, nitrogen, oxygen, and water vapor.

16. The method of claim 12, wherein degassing the second portion of fuel comprises using a vacuum source.

17. The method of claim 16, wherein degassing the second portion of fuel comprises using a membrane.

18. The method of claim 16, wherein degassing the second portion of fuel comprises using a degassing pump.

19. The method of claim 12, wherein degassing the second portion of fuel comprises using a membrane with a sweep gas.

20. The method of claim 12, wherein degassing the second portion of fuel further comprises simultaneous removal of oxygen.

* * * * *